(12) United States Patent
Holloway et al.

(10) Patent No.: US 8,516,469 B2
(45) Date of Patent: Aug. 20, 2013

(54) FUNCTION BINDING METHOD AND SYSTEM

(75) Inventors: Mark Richard Holloway, Reading (GB); Martin Clive Gray, Wokingham (GB); Alan Walter Stiemens, Reading (GB); David Christopher Wyles, Reading (GB)

(73) Assignee: Flexera Software LLC, Schaumburg, IL (US)

( * ) Notice: Subject to any disclaimer, the term of this patent is extended or adjusted under 35 U.S.C. 154(b) by 1164 days.

(21) Appl. No.: 11/188,818

(22) Filed: Jul. 25, 2005

(65) Prior Publication Data

US 2007/0022417 A1 Jan. 25, 2007

(51) Int. Cl.
*G06F 9/45* (2006.01)

(52) U.S. Cl.
USPC ........... 717/162; 717/163; 717/164; 717/165; 717/166; 717/167

(58) Field of Classification Search
USPC .................. 717/162, 163, 164, 165, 166, 167
See application file for complete search history.

(56) References Cited

U.S. PATENT DOCUMENTS

| | | | | |
|---|---|---|---|---|
| 5,862,220 | A | | 1/1999 | Perlman |
| 5,916,308 | A | | 6/1999 | Duncan et al. |
| 5,923,882 | A | * | 7/1999 | Ho et al. ....................... 717/147 |
| 5,956,513 | A | * | 9/1999 | McLain, Jr. ................... 717/142 |
| 5,991,541 | A | * | 11/1999 | Ozalp ........................... 717/164 |
| 6,003,095 | A | * | 12/1999 | Pekowski et al. ............. 717/163 |
| 6,026,242 | A | * | 2/2000 | Chessin et al. ................ 717/162 |
| 6,199,203 | B1 | * | 3/2001 | Saboff ........................... 717/168 |
| 6,282,703 | B1 | * | 8/2001 | Meth et al. .................... 717/163 |
| 6,321,275 | B1 | * | 11/2001 | McQuistan et al. .......... 719/330 |
| 7,047,522 | B1 | * | 5/2006 | Dixon et al. .................. 717/131 |
| 2004/0015884 | A1 | | 1/2004 | Shann et al. |
| 2006/0101284 | A1 | * | 5/2006 | Feuser et al. .................. 713/189 |

OTHER PUBLICATIONS

Duggan, D. "Type-Safe Linking with Recursive DLLs and Shared Libraries", 2002, ACM, p. 711-804.*
Fong, et al. "Proof Linking: Modular Verification of Mobile Programs in the Presence of Lazy, Dynamic Linking", 2001, ACM, p. 379-409.*

* cited by examiner

*Primary Examiner* — Qamrun Nahar
(74) *Attorney, Agent, or Firm* — Michael A. Glenn; Perkins Coie LLP

(57) ABSTRACT

The present invention provides a process for generating a shared function binding arrangement comprising a first module and a shared module which includes a plurality of functions and having means for binding a function shared between the first module and the shared module. The process comprises a linking phase for creating the first module and the shared module, a preparation phase for preparing the first module for calling the shared module without exposing details of the call, and a loading phase for loading the modules and linking the first module to a respective function in the shared module without exposing details of the call. The invention also provides a method and system for binding a function shared between a first module and a shared module by means of a linking arrangement a linking arrangement that enables the first module to call a respective function in the shared module without exposing details of the call.

31 Claims, 5 Drawing Sheets

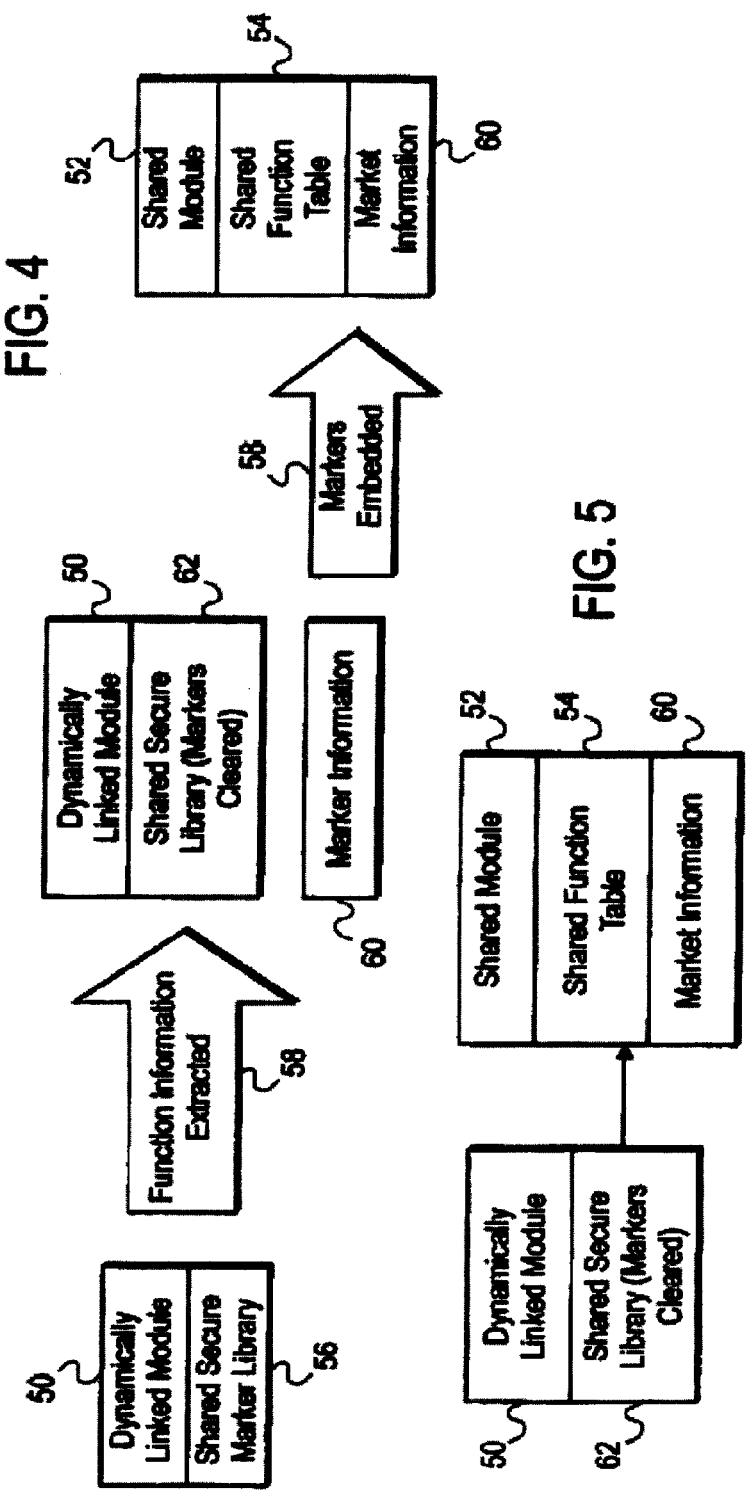

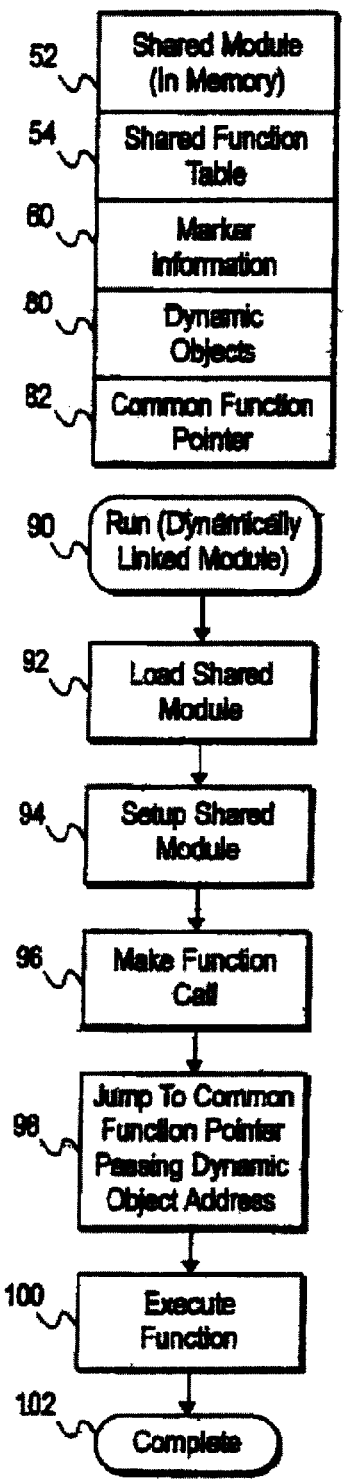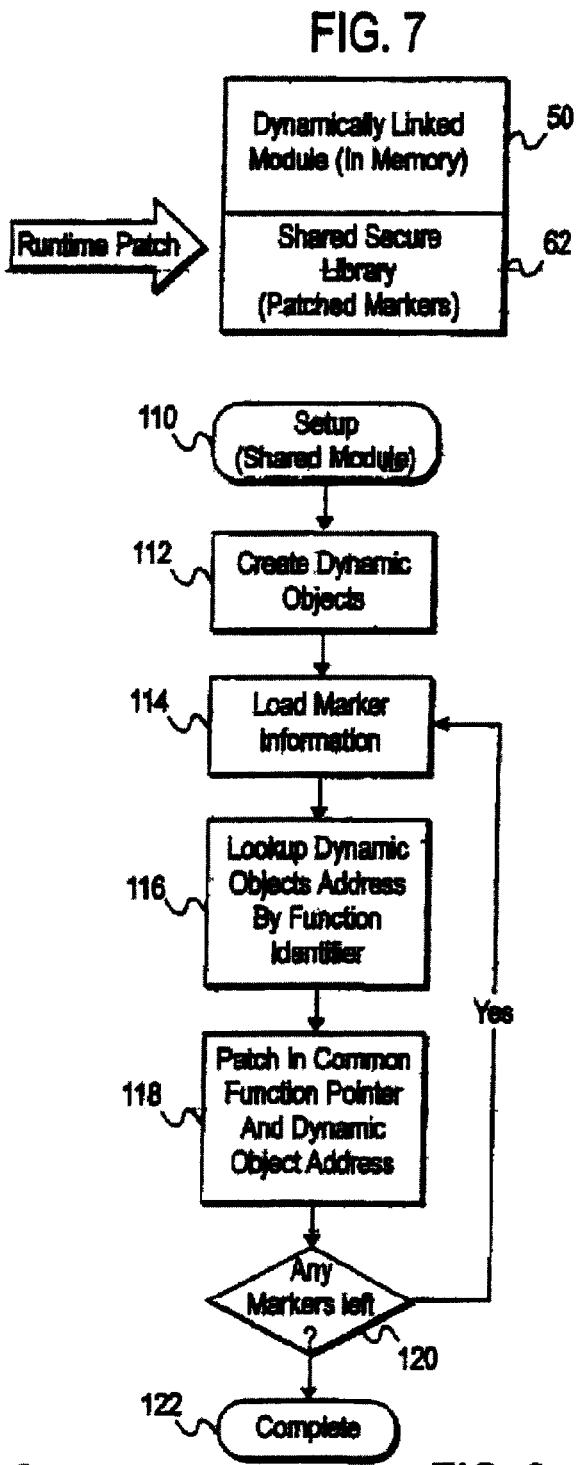

FUNCTION BINDING METHOD AND SYSTEM

FIELD OF THE INVENTION

Processing technology is known for linking two modules together at runtime so that one module can call functions located in another module. A module here may be considered to be a binary image representing a program. Two forms of such processing technology exist for linking one module to another. According to one, a module 12 may be statically linked to a shared module 10 and, according to the other, a module 14 may be dynamically linked to a shared module 10 as shown in FIGS. 1, 2A and 2B of the accompanying drawings. It is to be appreciated that in practice there may be any number of modules 12, 14 statically or dynamically linked to and capable of calling the shared module 10. However, in FIGS. 1, 2A and 2B, only one statically linked module 12 and only one dynamic linked module 14 are shown for the sake of simplicity. The expressions "statically linked" and "dynamically linked" are employed here to refer to the nature of the inherent association between the relevant module and the shared module, irrespective of whether a call is currently being made.

The processing technology for statically linking a respective module 12 and the shared module 10, or in other words for binding a function shared from the module 10 to the statically linked module 12, will be described first and involves a series of phases starting with a linking phase. In the linking phase, object files and library files are employed to produce both a shared module 10, comprising a library of functions and an export table 16 containing a catalogue of the functions, and a statically linked module 12, having an import table 18 containing implicit reference to the export table 16. Next, in a load phase, the operating system firstly loads the statically linked module 12 and secondly loads the shared module 10 to provide the architecture shown in FIG. 1. This is described further with respect to FIG. 2a, in which it is assumed that the statically linked module 12 has already been loaded.

During runtime, when the statically linked module 12 wishes to run a particular shared function, for example a print function, this commences the routine shown in the flow chart of FIG. 2a, at step 20. The operating system responds in step 22 by looking up the import table 18 in the statically linked module 12 and discovering that a function in the shared module 10 is required, at which point the operating system loads the shared module 10. Such a step is implicit in that the operating system is arranged to initiate the loading and not the statically linked module 12, and this is what is meant herein by the module 12 being statically linked to the shared module 10. Having loaded the shared module 10, the operating system proceeds in step 24 to use the export table 16 of the shared module 10 to locate the particular function that is required, in this instance the print function. The operating system then enquires in step 26 whether the function address obtained from the export table 16 is already stored in the import table 18 of the statically linked module 12. If the answer is yes, the operating system proceeds to step 32 and jumps to the actual function in the shared module 10. If, on the other hand, the answer is no in step 26, then the operating system proceeds in step 28 to obtain the function lookup address in the export table 16 of the shared module 10, and in step 30 to store the function address in the import table 18 of the statically linked module 12. The operating system then proceeds to step 32 and jumps to the actual function in the shared module 10.

The difference between the case of the statically linked module 12 and that of the dynamically linked module 14 is that, in the case of the dynamically linked module 14, the shared module 10 and the dynamically linked module 14 are both independently generated in the linking phase without reference to one another. When the operating system loads the dynamically linked module 14, the module 14 may subsequently prompt the operating system to load the shared module 10 to provide the architecture shown in FIG. 1. This is described further with respect to FIG. 2b, in which it is assumed that the dynamically linked module 14 has already been loaded.

During runtime, when the dynamically linked module 14 wishes to run a particular shared function, such as a print function, the routine illustrated in the flow chart in FIG. 2b is executed. In step 36, the dynamically linked module 14 asks the operating system to load the shared module 10 by name. This request is explicit in that it is the dynamically linked module 14 itself and not the operating system that is arranged to initiate the loading of the shared module 10, and this is what is meant herein by the module 14 being dynamically linked to the shared module 10. The dynamically linked module 14 proceeds in step 38 to ask the operating system to lookup the function address by name or ordinal in the export table 16 of the shared module 10. It is then at the discretion of the dynamically linked module 14 to call the function in the shared module 10 via this address, in step 40.

One of the main problems with this architecture concerns security in that from a security perspective the function binding from different modules, whether statically or dynamically linked, to the shared module is insufficiently tight. Access to functions within the shared module 10 is effectively achieved simply by looking up function addresses by name in the export table 16 and by calling the relevant function at the named address, so that there is little to prevent the interception and possible re-routing of calls. As a result, unauthorised monitoring of function use, function interception and unauthorised modification of function information is a relatively simple matter.

SUMMARY OF THE INVENTION

It is an object of the invention to overcome the above problems.

Another object of the invention is to provide a means for providing a link permitting a first module to call a respective function in a shared module without exposing details of the call.

A further object of the invention in its preferred form described below is to enable a function to be exported from a shared module such that a call in the shared module is not exposed in an export table of the shared module and such that the caller, ie another module; need not expose the need for the function in its own import table.

A further object of the invention in its preferred form described below is to provide a linkage between two modules, which may not be adduced by image analysis of the calling module at least.

According to one aspect of the present invention, there is provided a process for generating a shared function binding arrangement comprising a first module and a shared module including a plurality of functions and having means for binding a function shared between the first module and the shared module, the process comprising: a linking phase for creating the first module and the shared module, a preparation phase for preparing the first module for calling the shared module without exposing details of the call, and a loading phase for loading the modules and linking the first module to a respective function in the shared module without exposing details of the call.

According to another aspect of the invention, there is provided a method of binding a function shared between a first module and a shared module including a plurality of functions in a shared function binding arrangement, the method comprising: calling the shared module from the first module and linking the first module to a respective function in the shared module without exposing details of the call.

According to a further aspect of the invention, there is provided a system for binding a function shared between a first module and a shared module in a shared function binding arrangement, the system comprising a first module, a shared module including a plurality of functions, and a linking arrangement that enables the first module to call a respective function in the shared module without exposing details of the call.

BRIEF DESCRIPTION OF THE DRAWINGS

The invention will be described further, by way of example only, with reference to the accompanying drawings, in which:

FIG. 3 is a schematic diagram representing a linking phase in a binding process for dynamically linking a module to a shared module according to the present invention;

FIG. 4 is a schematic diagram representing a preparation phase in a binding process for dynamically linking a module and a shared module together according to the present invention;

FIG. 5 is a schematic diagram representing the outcome of the preparation phase in FIG. 4;

FIG. 7 is a schematic diagram representing a load phase in a binding process for dynamically linking a module and a shared module together according to the present invention;

FIG. 8 is a flow chart representing a runtime routine in the load phase for the dynamically linked module and the shared module by which a function is accessed in the shared module and executed; and FIG. 9 is a flow chart representing a sub-routine in the routine of FIG. 8.

DESCRIPTION OF PREFERED EMBODIMENTS

Figure 1:
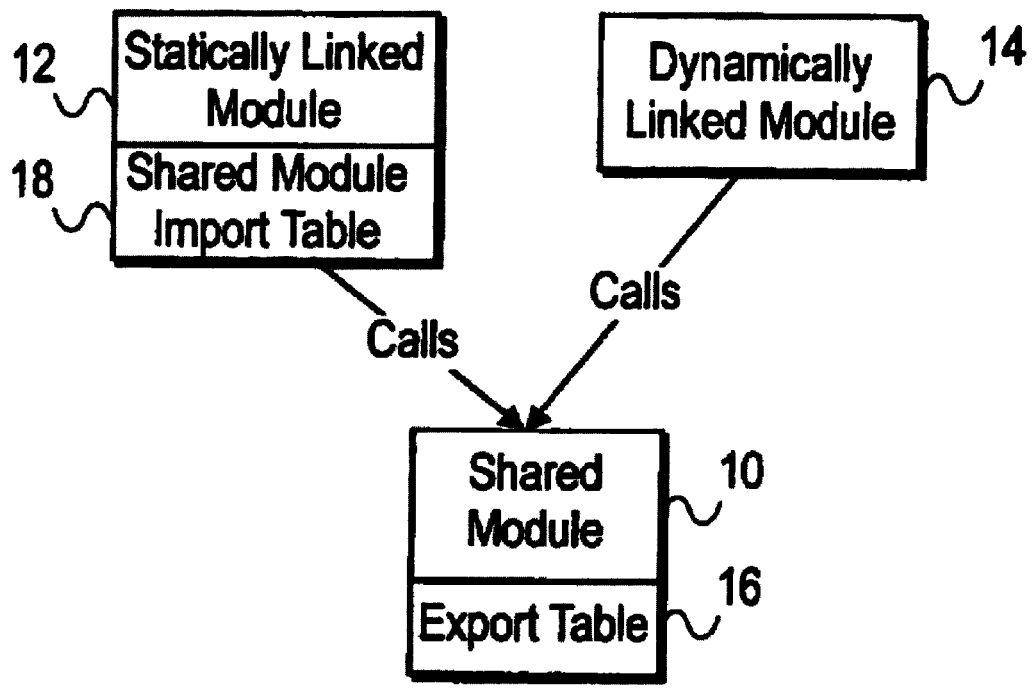
FIG. 1 is a schematic diagram of a conventional system for linking two or more modules together.
Figures 2A, 2B:
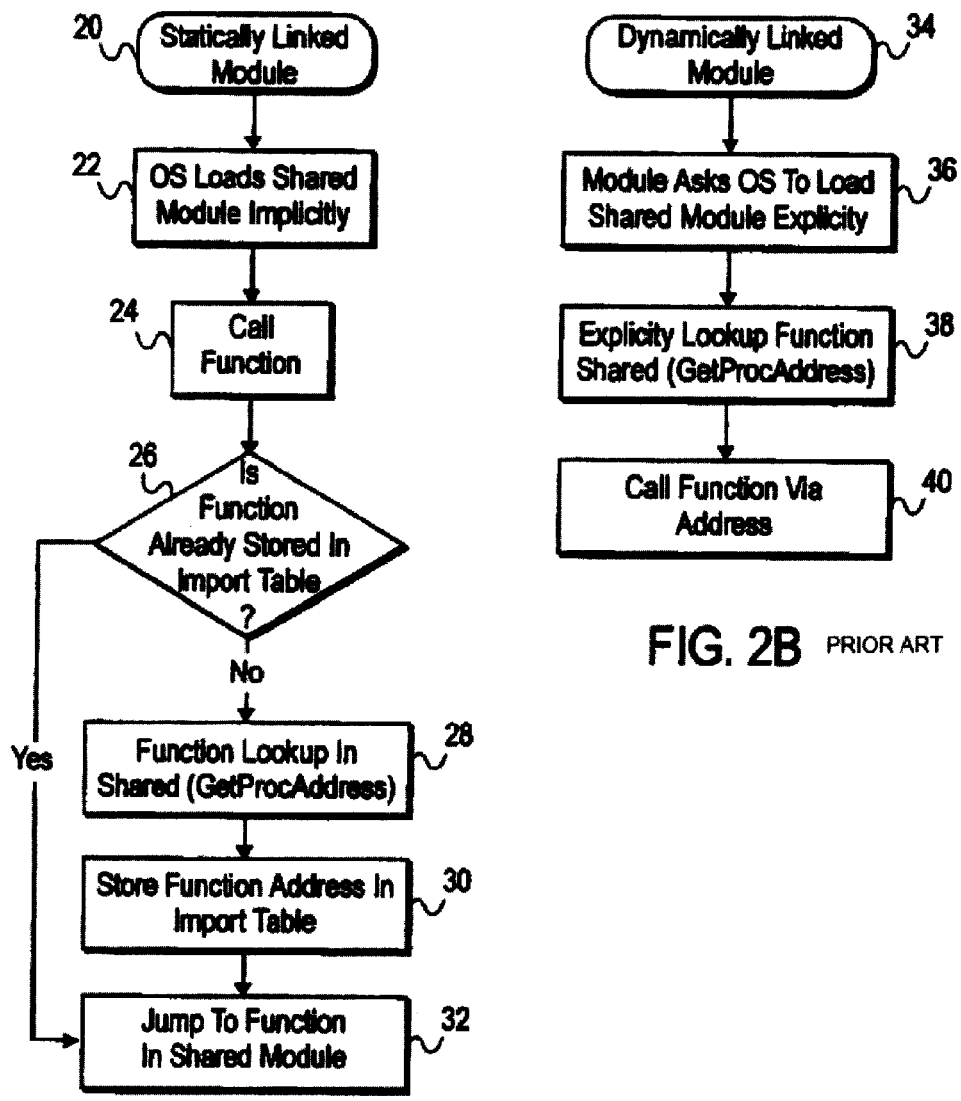
FIGS. 2a and 2b are flowcharts representing the linking process respectively in a case where a module is statically linked with a shared module and in a case where a module is dynamically linked with a shared module in the system of FIG. 1.

The invention will now be described with reference to an embodiment shown in the drawings. It is to be understood that the described embodiment is illustrative only, and that various modifications are possible, some of which will be mentioned in the following description.

Whereas the prior art was described with reference to the linking of either a statically linked module 12 or a dynamically linked module 14 with a shared module 10, the invention will be described with reference only to the function binding of a dynamically linked module 50 to a shared module 52. As described in relation to the prior art, the binding process in the present instance involves a series of phases including a linking phase and, at runtime when the module 50 wants to run a particular function, a load phase. According to the invention, however, an extra phase, namely a preparation phase, is inserted between the linking phase and the load phase in order to create the binding process of the invention.

Figure 6:
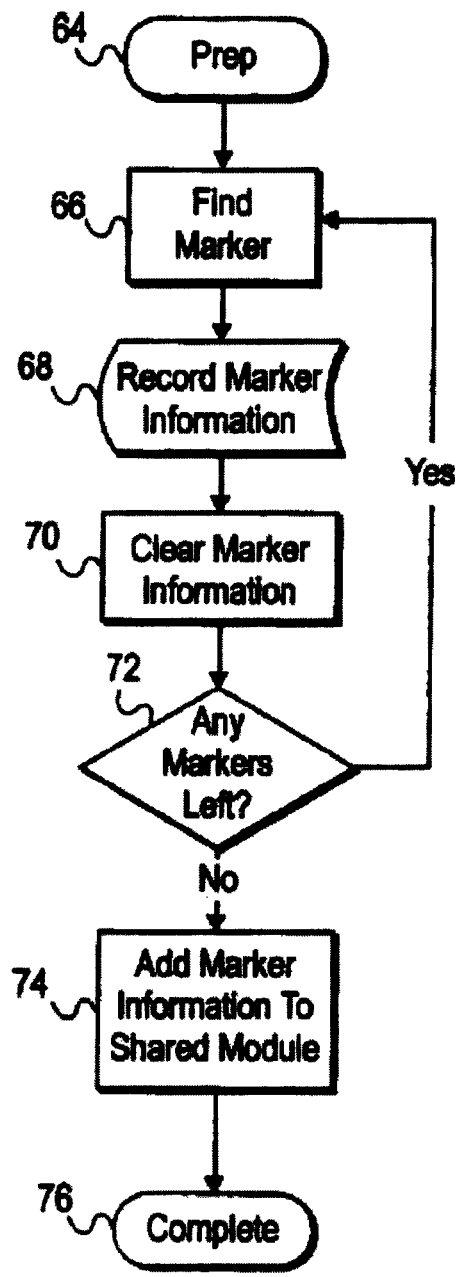
FIG. 6 is a flow chart representing a routine in the preparation phase of FIG. 4.

FIG. 3 shows the dynamically linked module 50 and shared module 52 at the outcome of the linking phase, FIG. 4 shows a basic modification of the two modules 50, 52 in the preparation phase, and FIG. 5 shows both modules at the outcome of the preparation phase, at which time the dynamically linked module 50 is ready to call the shared module 52 for accessing function information in the shared module 52. FIG. 6 is a flow chart showing the steps involved in the preparation phase. The linking and preparation phases will now be described with reference to FIGS. 3 to 6.

According to the invention, in the linking phase as shown in FIG. 3, the shared module 52 is created with a shared function table 54 that associates numeric identifiers with respective functions, which another module may wish to access, as described below. An additional conventionally shared setup function is also included in the shared module 52. The dynamically linked module 50 is also created with a shared secure marker library 56 that includes function proxies, markers capable of subsequently identifying functions in the shared module 52 through the shared function table 54, and marker addresses. Each function proxy represents an actual function and appears identical to the actual function but is in practice effectively an indirect routing mechanism for receiving the calls for the actual function and routing such calls through to the intended destination (the actual function). The markers basically comprise the same numeric identifiers as those in the shared function table 54. At this stage, however, the dynamically linked module 50 is not able to call any of the functions in the shared module 52 because it has not been provided with a basic address in the shared module 52 to which to route calls.

In the next stage of the binding process, namely the preparation phase as shown in FIG. 4, a specific programme for implementing the preparation phase, termed a preparation tool and designated by the arrows 58, extracts from the shared secure marker library 56 the marker information, concerning the numerical identifiers and the marker addresses, and encrypts and embeds this information in the shared module 52 as marker information 60 for associating addresses with the numeric identifiers in the shared function table 54. This leaves behind in the dynamically linked module 50 a shared secure library 62 from which the markers have been cleared but which still includes the function proxies. At this stage, the shared secure library 62 in the dynamically linked module 50 contains no information capable of accessing the shared function table 54 of the shared module 52, and of determining the destination function in the shared module 52, and the marker information 60 in the shared module 52 is encrypted for further protecting the function information in the shared module 52. The dynamically linked module 50 is, however, now in a state where it is ready for calling the shared module 52.

The steps in the preparation tool 58 of FIG. 4 for implementing the preparation phase are shown in FIG. 6 and start at step 64 when the preparation phase is initiated. The preparation tool proceeds to step 66 and finds in the shared secure marker library 56 a respective marker, carrying a numerical identifier for one of the functions in the shared function table 54, and the associated marker address. In step 68, the preparation tool 58 encrypts and records the marker content and address, and then in step 70 clears the marker content and address from the shared secure marker library 56. Next, at step 72, the preparation tool inquires whether any markers remain within the shared secure marker library 56. If the answer is yes, the preparation tool 58 reverts to step 66 and finds another marker. If the answer is no, the preparation tool 58 proceeds to step 74 and adds the encrypted marker address and numeric function identifier information to the marker information 60 in the shared module 52. The preparation tool 58 now proceeds to step 76 and indicates that the preparation phase is complete.

At runtime, the shared module 52 adds a common function pointer to the dynamically linked module 50 providing a general call address in the shared module 52 for receiving calls, and creates within itself dynamic objects for routing the common function calls to real function addresses stored in the marker information 60. This process is described further in the following paragraphs with reference to FIGS. 7 to 9.

At runtime, the dynamically linked module 50 including the shared secure library 62 as shown in FIG. 5 is firstly loaded by the operating system. Next, the dynamically linked module 50 instructs the operating system to load the shared module 52 including the shared function table 54 and the marker information 60 as also shown in FIG. 5. Following this, the shared module 52 creates within itself a set of dynamic objects 80, each representing a respective function within the shared module 52 and including an encrypted address for that function for accessing the function through the shared function table 54. Effectively, each dynamic object 80 comprises a dynamically allocated memory block containing an encrypted function pointer, which may be employed for routing calls indirectly to a decrypted function address. A property of dynamically allocated memory is that it has a different memory address for each execution of the relevant process, which provides an element of non predictability and hence enhances security. There is thus provided an indirect routing link in the shared module 52 to a particular function. The shared module 52 also creates a common function pointer 82 providing a pointer to the general call address within the shared module 52 for routing calls from the dynamically linked module 50. Next, the dynamically linked module 50 calls the conventionally shared setup function in the shared module 52 to request the shared module 52 to patch into the dynamically linked module 50 the common function pointer 82 and to use the marker information 60 to patch into the dynamically linked module 50 patch markers including addresses for the dynamic objects 80. Such patch markers and the common function pointer 82 are added to the shared secure library 62 of the shared module 52. This now enables the dynamically linked module 50 to make calls to the shared module 52.

The processing routine for implementing the load phase of FIG. 7 and subsequently for executing a function is shown in FIGS. 8 and 9, in which it is assumed that the dynamically linked module 50 has already been loaded. The dynamically linked module 50 initiates the runtime operation at step 90 and proceeds to step 92, in which the dynamically linked module 50 requests the operating system to load the shared module 52. The dynamically linked module 50 then calls the conventionally shared setup function in the shared module 52 in step 94. These steps are explicit, as described earlier, in that the dynamically linked module 50 initiates them and not the operating system. In step 94, the shared module 52 follows the sub-routine shown in FIG. 9. This sub-routine commences at step 110 and proceeds to step 112 when the shared module 52 creates the dynamic objects 80 and the common function pointer 82. The shared module 52 then proceeds firstly to step 114 and loads a marker address and function identifier from the marker information 60 in the shared module 52, and next to step 116 and looks up a dynamic object address using the function identifier. In step 118, the shared module 52 patches into the shared secure library 62 of the dynamically linked module 50 the common function pointer 82 and the respective dynamic object address such that they are both accessible by way of a respective function proxy. The shared module 52 now proceeds to step 120 and enquires whether any addresses remain in the marker information 60. If the answer is yes, the shared module 52 reverts to step 114. On the other hand, if the answer is no, the sub-routine for setting up the shared module 52 is indicated to be complete in step 122.

Once the shared module is set up according to step 94 in FIG. 8, the dynamically linked module 50 and the shared module 52 are ready to respond when the dynamically linked module 50 wishes to execute a particular shared function, such as the print function. In order to call the relevant function, the dynamically linked module 50 in step 96 calls a respective function proxy in the shared secure library 62, which makes a call through the common function pointer 82 in the dynamically linked module 50 to the general call address in the shared module 52 with the address for the associated dynamic object 80 contained in the shared module 52. The shared module 52 responds in step 98 by routing the call to the associated dynamic object 80, which knows the address for the actual function in the shared function table 54 and accesses the function in the shared module 52. The shared module 52 proceeds to step 100 and executes the function, following which, the shared module 52 indicates in step 102 that the runtime operation is complete.

The present invention provides a shared function binding arrangement in which shared calls are not exposed within the shared secure library 62 of the dynamically linked module 50 or within the dynamic objects 80 of the shared module 52. As a result, the binding between the dynamically linked module 50 and the shared module 52 is tightly created and preserves the security of data during runtime.

In practice, although the above description relates to function binding between only one dynamically linked module 50 and the shared module 52, the invention is likely to be applied to a system in which the shared module 52 is capable of sharing functionality with a plurality of dynamically linked modules 50.

The present invention as described has a number of advantages. In particular, the linkage between the dynamically linked module 50 and the shared module 52 cannot readily be deduced by static image analysis of the dynamically linked module 50 or potentially by static image analysis of the shared module 52 through the examination of disassembled machine code. This reduces the possibility of modifying the code and corrupting the stored data.

We claim:

1. A computer-implemented method comprising:
    calling a shared module from a first module for a respective function, concealing details of the call for the respective function, said concealing comprising:
        encrypting and embedding marker information in the shared module, wherein the marker information identifies functions including the respective function in the shared module through a shared function table, and wherein the marker information is embedded prior to run time; and
    using a respective function proxy in the first module to call a common function pointer in the first module, which makes a call to a general call address in the shared module with an address for a respective dynamic object which knows the address of the respective function: and
    linking the first module to the respective function in the shared module.

2. A computer-implemented method according to claim 1 in which linking the first module comprises forming an indirect routing link in the first module between an input carrying a request for the respective function and an output carrying the call to the shared module.

3. A computer-implemented method according to claim 1 in which linking the first module comprises forming an indirect routing link in the shared module between an input carrying the call from the first module and an address for the respective function.

4. A computer-implemented method according to claim 2 in which forming an indirect routing link comprises providing function proxies in the first module.

5. A computer-implemented method according to claim 4 in which forming an indirect routing link comprises using a respective function proxy to access a respective address for a respective dynamic object in the shared module.

6. A computer-implemented method according to claim 3 in which forming an indirect routing link comprises providing a general call address in the shared module for indirectly locating the respective function.

7. A computer-implemented method according to claim 3 in which forming an indirect routing link comprises providing dynamic objects in the shared module including address information for locating the functions.

8. A computer-implemented method according to claim 7 in which forming an indirect routing link comprises using a respective dynamic object in the shared module for locating the respective function.

9. A computer-implemented method according to claim 7 further comprising encrypting the address information.

10. A computer-implemented method according to claim 1 in which linking the first module comprises providing a common function pointer in the first module for locating a general call address in the shared module.

11. A computer-implemented method according to claim 1 in which linking the first module comprises using a dynamic object address in the first module for locating a dynamic object in the shared module.

12. A computer-implemented process comprising:
creating a first module and a shared module, preparing the first module for calling the shared module;
concealing details of a particular call for a respective function, said concealing comprising:
encrypting and embedding marker information in the shared module, wherein the marker information identifies functions including the respective function in the shared module through a shared function table, and wherein the marker information is embedded prior to run time; and
using a respective function proxy in the first module to call a common function pointer in the first module, which makes a call to a general call address in the shared module with an address for a respective dynamic object which knows the address of the respective function; and
loading the first and the shared modules and linking the first module to the respective function in the shared module.

13. A computer-implemented process according to claim 12 in which creating the first module and the shared module comprises generating a first module including a secure library containing information for subsequently locating the functions.

14. A computer-implemented process according to claim 13 in which the secure library comprises markers for locating functions by way of identifiers.

15. A computer-implemented process according to claim 13 in which the secure library comprises function proxies.

16. A computer-implemented process according to claim 12 in which creating the first module and the shared module comprises generating the shared module including the plurality of functions and a shared function table associating identifiers with the functions.

17. A computer-implemented process according to claim 12 in which preparing the first module comprises extracting marker information from the first module and embedding the marker information in the shared module.

18. A computer-implemented process according to claim 17 in which preparing the first module comprises clearing the marker information from the first module.

19. A computer-implemented process according to claim 12 in which the loading phase comprises loading the first module.

20. A computer-implemented process according to claim 19 in which loading comprises loading the shared module on an instruction from the first module.

21. A computer-implemented process according to claim 12 in which loading comprises creating within the shared module dynamic objects including address information for locating the functions.

22. A computer-implemented process according to claim 12 in which loading comprises patching into the first module the common function pointer.

23. A computer-implemented process according to claim 21 in which loading comprises patching into the first module addresses for the dynamic objects.

24. A computer-implemented process according to claim 21 comprising encrypting the address information.

25. A system comprising:
a processor;
a first module;
a shared module including a plurality of functions, and
a linking arrangement that enables the first module to call a respective function in the shared module, the linking arrangement enabling concealing details of the call, said concealing comprising:
encrypting and embedding marker information in the shared module, wherein the marker information identifies functions in the shared module through a shared function table, and wherein the marker information is embedded prior to run time; and
using a respective function proxy in the first module to call a common function pointer in the first module, which makes a call to a general call address in the shared module with an address for a respective dynamic object which knows the address of the respective function.

26. A system according to claim 25 in which the linking arrangement comprises an indirect routing link in the first module between an input for carrying a request for the respective function and an output for carrying a call to the shared module.

27. A system according to claim 25 in which the linking arrangement comprises an indirect routing link in the shared module between an input for carrying a call from the first module and an address for the respective function.

28. A system according to claim 26 in which the indirect routing link comprises a common function pointer in the first module for locating a general call address in the shared module.

29. A system according to claim 26 in which the indirect routing link comprises a respective dynamic object address in the first module for a respective dynamic object in the shared module.

30. A system according to claim 29 in which the indirect routing link comprises a respective function proxy in the first module for routing to the respective dynamic object address.

31. A system according to claim 27 in which the address information is encrypted.

* * * * *